US006934803B2

(12) United States Patent
Soulier et al.

(10) Patent No.: US 6,934,803 B2
(45) Date of Patent: Aug. 23, 2005

(54) METHODS AND STRUCTURE FOR MULTI-DRIVE MIRRORING IN A RESOURCE CONSTRAINED RAID CONTROLLER

(75) Inventors: Paul Soulier, Colorado Springs, CO (US); Brad Besmer, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 525 days.

(21) Appl. No.: 10/157,285

(22) Filed: May 29, 2002

(65) Prior Publication Data

US 2003/0225794 A1 Dec. 4, 2003

(51) Int. Cl.⁷ .............................................. G06F 12/00
(52) U.S. Cl. ...................................... 711/114; 711/157
(58) Field of Search ................................. 711/114, 157

(56) References Cited

U.S. PATENT DOCUMENTS

| | | | | |
|---|---|---|---|---|
| 6,304,941 B1 | * | 10/2001 | Lyons et al. ................. | 711/114 |
| 2002/0194530 A1 | * | 12/2002 | Santeler et al. ................ | 714/6 |
| 2003/0070043 A1 | * | 4/2003 | Merkey ...................... | 711/114 |

OTHER PUBLICATIONS

IBM Corporation, "IBM Netfinity RAID Technology", 1999, pp. 1–15 IBM Personal Computer Company, Department L06A, 3039 Cornwallis Road Research Triangle Park, NC 27709.

ServeRAID–4 Ultra 160 SCSI Controllers; IBM Corp., Apr. 2000.

IBM Netfinity ServeRAID–3HB and –3L Ultra2 SCSI Adapters; IBM Corp., Apr. 2000.

* cited by examiner

*Primary Examiner*—Jack A. Lane
(74) *Attorney, Agent, or Firm*—Duft Bornsen & Fishman, LLP

(57) ABSTRACT

Methods and associated structure for mapping of data stripes and stripes in a RAID level 1E storage subsystem such that associated stripes of multiple physical stripes are physically contiguous. This mapping eliminates the need for duplicative reading (or writing) of stripes unrelated to the underlying I/O request performed to reduce the total number of I/O requests. This mapping also serves to limit the number of I/O requests required to read multiple stripes to the number of disk drives in the array and the number required to write multiple stripes and their corresponding mirrors to twice the number of disk drives in the array. The effects of this mapping therefore simplify RAID level 1E management in RAID controller with constrained memory and processing resources.

7 Claims, 4 Drawing Sheets

METHODS AND STRUCTURE FOR MULTI-DRIVE MIRRORING IN A RESOURCE CONSTRAINED RAID CONTROLLER

BACKGROUND OF THE INVENTION

1. Field of the Invention

The invention relates generally to RAID controller designs and more specifically relates to improved methods and structure for multi-drive mirroring and striping in a resource constrained RAID controller as for example in RAID level 1E (i.e., Enhanced RAID 1).

2. Discussion of Related Art

It is generally known in the art to utilize RAID storage management methods and structures for high-performance, high-capacity storage subsystems that require high reliability. In a RAID storage subsystem (Redundant Array of Independent Drives), a plurality of disk drives is utilized in accordance with RAID management techniques to improve both reliability and performance of the storage subsystem.

RAID level 0 refers to a RAID management storage technique whereby data stored in the storage subsystem is "striped" across multiple drives. Striping of data involves subdividing the user-supplied data into logical groupings or stripes such that multiple stripes for a portion of the data are distributed over multiple disk drives in the RAID storage array. Each stripe is a physically contiguous portion of the disk drive on which it is stored. Distribution of data stripes over multiple disk drives of the array permits I/O operations for retrieving and storing data to proceed in parallel over multiple disk drives thus improving the subsystem performance for retrieval or storage of data. The I/O operations required to retrieve or store the supplied data are distributed over the multiple disk drives in accordance with the striping methods and structures. By contrast, an equivalent amount of data retrieved or stored on a single disk drive would be slower by a factor approximately proportional to the number of disk drives used in a RAID striping configuration. Striping (RAID level 0) therefore addresses performance issues relating to retrieval or storage of data on a storage subsystem.

Other levels of RAID storage management are associated with improved reliability. For example, RAID level 1 storage management structures and methods duplicate each stripe of data onto at least one additional disk drive. The duplicated data is also commonly referred to as mirrored information. Mirroring of user supplied data over multiple disk drives improves reliability of the storage subsystem in that if a single disk drive of the subsystem is unavailable or otherwise inoperable, the duplicate data stored in a mirrored disk drive is available to continue operation of the storage subsystem. The mirrored data is also more generally referred to as redundant information.

Other levels of RAID storage management techniques provide different forms of redundant information such that loss of a single disk drive in the array does not preclude further operation of the entire storage subsystem.

Another particular form of RAID storage management provides a hybrid approach combining RAID level 0 striping with RAID level 1 mirroring. This particular RAID storage management technique is often referred to as Enhanced RAID 1 or as RAID level 1E. In RAID level 1E storage management, user data is striped over multiple disk drives. The mirrored copy of the user-supplied data is also striped over multiple disk drives but shifted with respect to the initial disk drives such that the original user data stripe and its corresponding mirrored stripe will never be on the same disk drives. RAID level 1E therefore provides the reliability enhancements of RAID level 1 by mirroring user supplied data and provides the performance enhancement of RAID level 0 by striping all user data and corresponding mirrored data across multiple disk drives. RAID level 1E is therefore similar to the reliability provided by RAID level 1 but permits any number of disk drives to be used in the mirroring and striping process (in particular including odd numbers of disk drives).

RAID storage management techniques are typically performed by one or more RAID controllers associated with the RAID storage subsystem. Typically, a RAID storage controller is embedded within the storage subsystem and provides all management of the disk drives of the array. I/O requests are received from host systems coupled to the RAID storage subsystem through the RAID controllers and are processed to store or retrieve identified data to or from the disk drives of the array. RAID storage controllers therefore hide the low-level operation and management of disk drives of the array from the higher level functioning of the host systems. In particular, host systems are generally unaware of what, if any, redundancy is performed within the RAID storage subsystem and what, if any, striping is performed within the RAID storage subsystem. These functions are performed in a manner transparent to the host systems coupled to the RAID controllers.

In general, a RAID controller generates low-level I/O operations for the various disk drives of the array in response to I/O requests received from host systems coupled to the RAID storage subsystem. The low-level I/O operations read or write particular identified data stripes from or to disk drives of the array affected by the host system I/O requests. The overall performance of a RAID storage subsystem is largely dependent on efficient generation and processing of these low-level I/O operations by the RAID controller.

In general, a RAID controller generates a list of low-level I/O operations associated with each disk drive affected by the post system I/O requests being processed. Each such list is typically referred to as a "scatter/gather" list. The entries on the list "scatter" stripes of information to various locations within the disk drive (i.e., in write operations) and the "gather" information from various locations of the disk drive into a memory buffer (i.e., for read operations).

It is beneficial when performing such read or write I/O operations using a scatter gather list that the physical stripes to be read from each disk drive of the array be contiguous in the physical layout of the disk drive. If stripes are to be read from a single disk drive that are not physically contiguous, the I/O requests will complete more slowly because either the controller must separate the requests into two distinct requests or read additional, unnecessary data stripes between the desired non-contiguous stripes. Separating the request into multiple requests avoids the duplicative, unnecessary reading of data stripes but may add latency between the two operations due to disk rotation delays and head seek delays.

FIG. 1 depicts a physical mapping of stripes in an exemplary three disk RAID level 1E subsystem having six rows or stripes on each disk drive. A numeric identifier within the box representing the stripe on the corresponding disk identifies each stripe. The disk drive is identified at the top of the column of stripes as disk drive A (100), disk drive B (102) and disk drive C (104). A corresponding mirrored stripe appears in the physical mapping with a prime ("'") character associated with the same stripe number.

In accordance with standard RAID level 1E techniques as presently practiced in the art, a "physical stripe" (i.e., physical stripe 0) contains sequential stripe numbers, one for each disk drive of the array (i.e., stripe N, N+1 and N+2 for a three disk RAID level 1E array). The next physical stripe of the disk array (i.e., physical stripe 1) contains the corresponding mirrored data stripes (i.e., N', (N+1)' and (N+2)') shifted with respect to their respective disk drives such that a stripe and its associated mirrored stripe are never on the same physical drive. These stripes are physically contiguous with corresponding stripes of the preceding physical stripe. For example, as shown in FIG. 1, stripe 0 of physical stripe 0 (110) is contiguous with stripe 2' of physical stripe 1 (111) on disk drive A (100). in like manner, stripe 1 of physical stripe 0 (110) is contiguous with stripe 0' of physical stripe 1 (111) on disk drive B (102) and stripe 2 of physical stripe 0 (110) is contiguous with stripe 1' of physical stripe 1 (111) on disk drive C (104).

Physical stripe 2 (112) contains stripes 3, 4 and 5 on disk drives A, B and C (100, 102 and 104), respectively while physical stripe 3 (113) contains mirrored stripes 5', 3' and 4'. Stripes 3 and 5' are contiguous on disk drive A (100), stripes 4 and 3' are contiguous on disk drive B (102) and stripes 5 and 4' are contiguous on disk drive C (104). Physical stripe 4 (114) contains stripes 6, 7 and 8 on disk drives A, B and C (100, 102 and 104), respectively while physical stripe 5 (115) contains mirrored stripes 8', 6' and 7'. Stripes 6 and 8' are contiguous on disk drive A (100), stripes 7 and 6' are contiguous on disk drive B (102) and stripes 8 and 7' are contiguous on disk drive C (104).

For a RAID controller to read a single stripe of the array of FIG. 1, a single stripe is read from each of disk drives A, B and C. For example, to read physical stripe 0 comprising stripes 0, 1 and 2, stripe 0 is read from drive A, stripe 1 is read from drive B and stripe 2 is read from drive C. In this simple example, the scatter/gather list for reading from each disk drive consists of a single stripe read. Three I/O operations are generated and tracked and no extraneous (unused) stripes need be read.

However, where multiple stripes need be read, additional I/O operations and/or additional, unused stripes need be read. For example, to read all nine stripes (distributed over three physical stripes) depicted in the physical map of FIG. 1 requires either four I/O operations (four scatter/gather lists) or requires that additional, duplicative stripes be read.

The dashed lines in FIG. 1 indicates noteworthy breaks in the contiguous nature of stripes that may be read without the need for additional I/O operations or duplicative, wasteful reads of stripes. For example, stripes 0 through 5 (i.e., physical stripe 0 (110) and physical stripe 2 (112) cannot be accessed without such duplicative I/O operations or additional low level operations. Likewise, stripes 3 through 8 (i.e., physical stripe 2 (112) and physical stripe 4 (114) cannot be accessed without such duplicative I/O operations or additional low level operations. Still further, it is not possible to access all stripes (0 through 8) without such duplicative waste.

One possible technique to read all stripes in FIG. 1 (i.e., stripes 0 through 8 as shown) would require four I/O operations as follows:

1. A first scatter/gather list for drive A would read physically contiguous stripes 0, 2', 3, 5', 6 and 8'.

2. A second scatter/gather list for drive B would read stripe 1.

3. A third scatter/gather list for drive C would read stripe 4'.

4. A fourth scatter/gather list for either drive B or C would read stripe 7 or 7', respectively, since stripe 7 (or 7') is not contiguous to any other stripe read from drive B or C.

This sequence of operations requires an additional I/O operation on drive B (or C) to read a stripe not contiguous with any other stripe read from that drive. Generation and tracking of such an additional scatter/gather list can be problematic on a RAID controller constrained in terms of processing and/or memory capacity. To avoid duplicative reading of stripes requires that additional I/O requests be generated and tracked to read non-contiguous portions of at least one drive of the array.

Another possible technique for reading all stripes in the physical map of FIG. 1 would require only two I/O operations as follows:

1. A first scatter/gather list for drive A would read physically contiguous stripes 0, 2', 3, 5', 6 and 8'.

2. A second scatter/gather list for drive B would then read contiguous stripes 1, 0', 4, 3' and 7.

In this approach, the number of scatter/gather lists and corresponding I/O requests is reduced but at the cost of reading stripe 0' and 3' a second time (initially read in the first operation as stripes 0 and 3). The additional reading of these stripes may require extra buffer memory—also a potential problem for resource constrained RAID controllers.

Those skilled in the art will recognize numerous other possible sequences of I/O requests and corresponding scatter/gather list structures to read all physical stripes of the simple example of FIG. 1. However, all such techniques and structures will require either additional low-level I/O requests directed to at least one of the drives and corresponding scatter/gather list maintenance for those drives or will require duplicative, wasteful re-reading of stripes not required for the I/O request processing but required to perform contiguous reads from each disk drive of the array involved in the request.

The above problems similarly relate to write requests to the disks of the array. In fact, the problem is doubled due to the need to write redundant copies of each stripe changed by the write request.

It is evident from the above discussion that a need exists for improved RAID level 1E management to enable effective I/O management in resource constrained RAID controllers.

SUMMARY OF THE INVENTION

The present invention solves the above and other problems, thereby advancing the state of the useful arts, by providing methods and associated structure for RAID level 1E management useful in a resource constrained controller to reduce the number of I/O operations while avoiding duplicative, wasteful stripe reads. More specifically, the present invention provides methods and structure for mapping stripes and stripes on the disk drives of a RAID level 1E subsystem such that the number of I/O requests will never exceed the number of disk drives and such that extraneous, duplicative reads (or writes) will not be required for reading (or writing) stripes of the array.

Still more specifically, the present invention provides for mapping of data stripes on the disk drives such that multiple stripes containing sequential original stripes are stored in contiguous physical locations on the disk drives. The corresponding multiple mirrored stripes follow the original stripes in the physical mapping of the disk drives. With such a physical mapping, multiple stripes may be read using contiguous reads from all disks of the array. No duplicate stripes need be read to reduce the number of I/O requests and corresponding scatter/gather lists. Further, the number of such I/O requests and corresponding scatter/gather lists will not exceed the number of disk drives in the array. The number of such multiple stripes may be the entirety of the stripes in the array followed by an equal number of mirrored stripes. An alternate embodiment allows for array to be segmented into alternating large portions containing multiple original stripes followed by a equal sized portion containing an equal number of mirrored stripes.

A first feature of the invention provides a mapping structure for physically distributing original data stripes and mirrored data stripes onto a RAID level 1E disk array, the structure comprising: a first contiguous portion of each disk drive of the array containing multiple original data stripes; and a second contiguous portion of the each disk drive containing multiple mirrored data stripes corresponding to the multiple original data stripes.

Another aspect of the invention further provides that the first contiguous portion is half the total capacity of the each disk drive and such that the second contiguous portion is the other half of the total capacity of the each disk drive.

A second feature of the invention provides a method for processing requests involving multiple physical stripes in a RAID level 1E array comprising the steps of: receiving an I/O request to access the multiple physical stripes such that each stripe of the multiple physical stripes comprises multiple data stripes; accessing, responsive to receipt of the I/O request, physically contiguous data stripes on a disk of the array such that no stripe of the contiguous data stripes was previously accessed during processing of the I/O request; and repeating the step of accessing for another disk of the array such that all data stripes in the multiple physical stripes will be accessed only once.

Another aspect of the invention further provides that the I/O request is a read request and such that the step of accessing comprises the step of: reading the physically contiguous data stripes on the disk such that no stripe of the contiguous data stripes was previously read during processing of the I/O request.

Another aspect of the invention further provides that the I/O request is a write request and such that the step of accessing comprises the step of: writing the physically contiguous data stripes on the disk such that no stripe of the contiguous data stripes was previously written during processing of the I/O request.

Another aspect of the invention further provides for: writing physically contiguous mirrored data stripes to a disk of the array such that no stripe of the contiguous mirrored data stripes was previously written during processing of the I/O request; and repeating the step of writing mirrored data stripes for another disk of the array such that all mirrored data stripes corresponding to data stripes in the multiple physical stripes will be written only once.

A third feature of the invention provides for a method for processing I/O requests operable in a RAID level 1E disk array having a plurality of disks storing stripes and corresponding mirrored stripes such that each of the stripes and mirrored stripes comprises a plurality of stripes, the method comprising the steps of: receiving an I/O request to access multiple physical stripes on the disk array; and generating a plurality of low level I/O requests to access the multiple physical stripes on the disk array, such that each generated low level I/O request accesses multiple contiguous data stripes on a disk drive of the disk array, and such that no more than one low level I/O request is directed to any disk drive of the disk array.

DETAILED DESCRIPTION OF THE PREFERRED EMBODIMENTS

Figure 1:
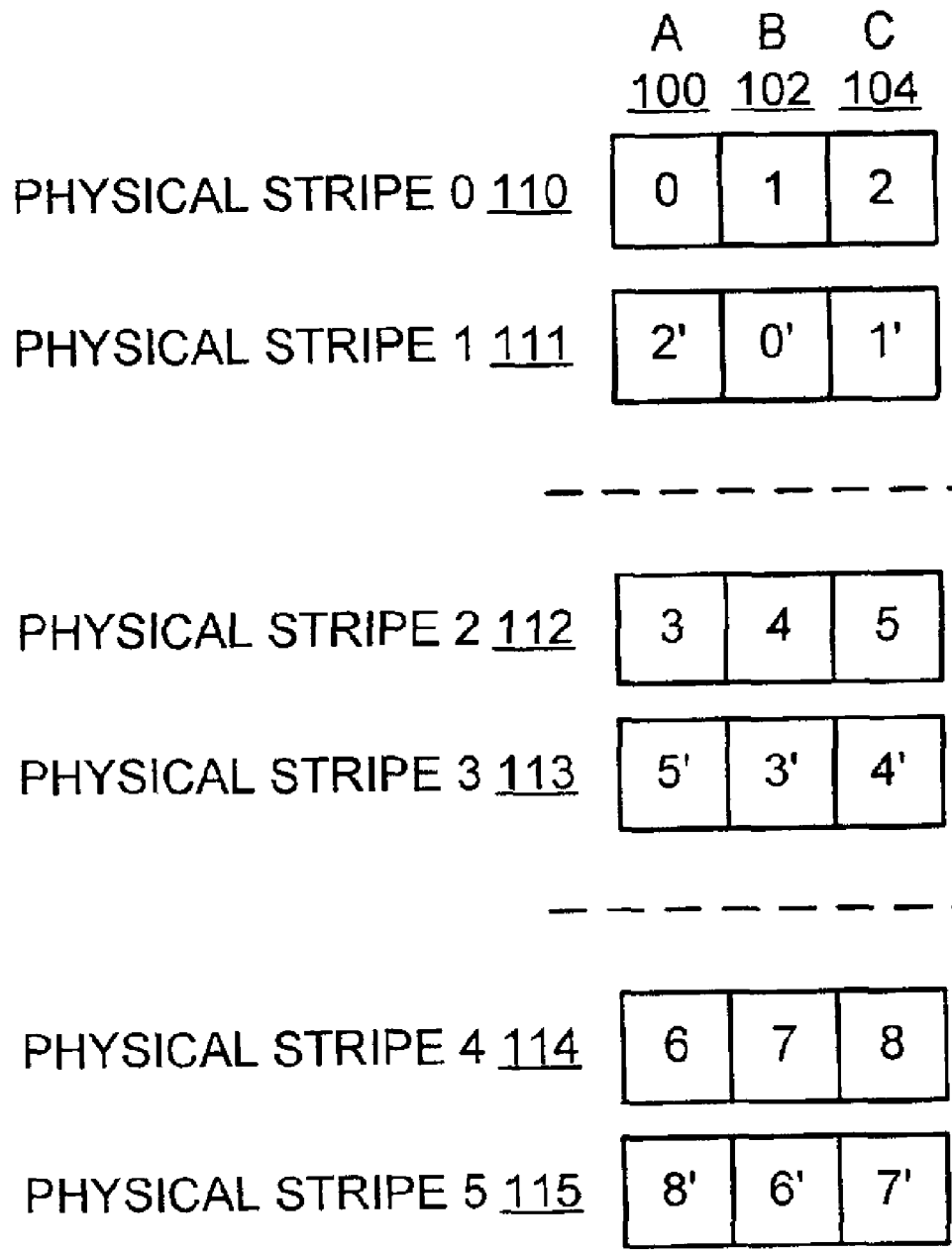
FIG. 1 is an exemplary physical of stripes on a RAID level 1E array as presently known in the art.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 3:
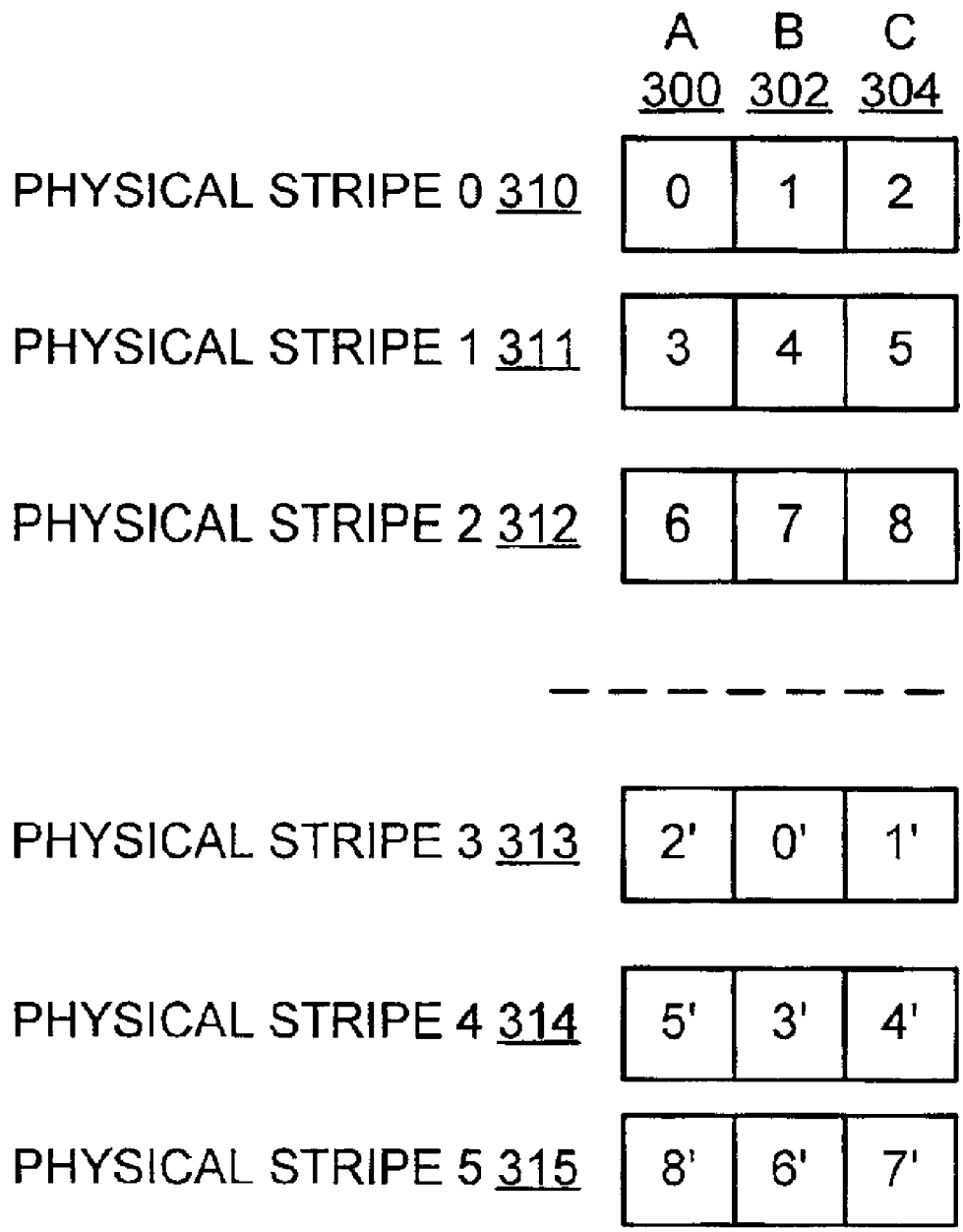
FIG. 3 is an exemplary physical mapping of stripes in a RAID level 1E array in accordance with the present invention.
Figure 4:
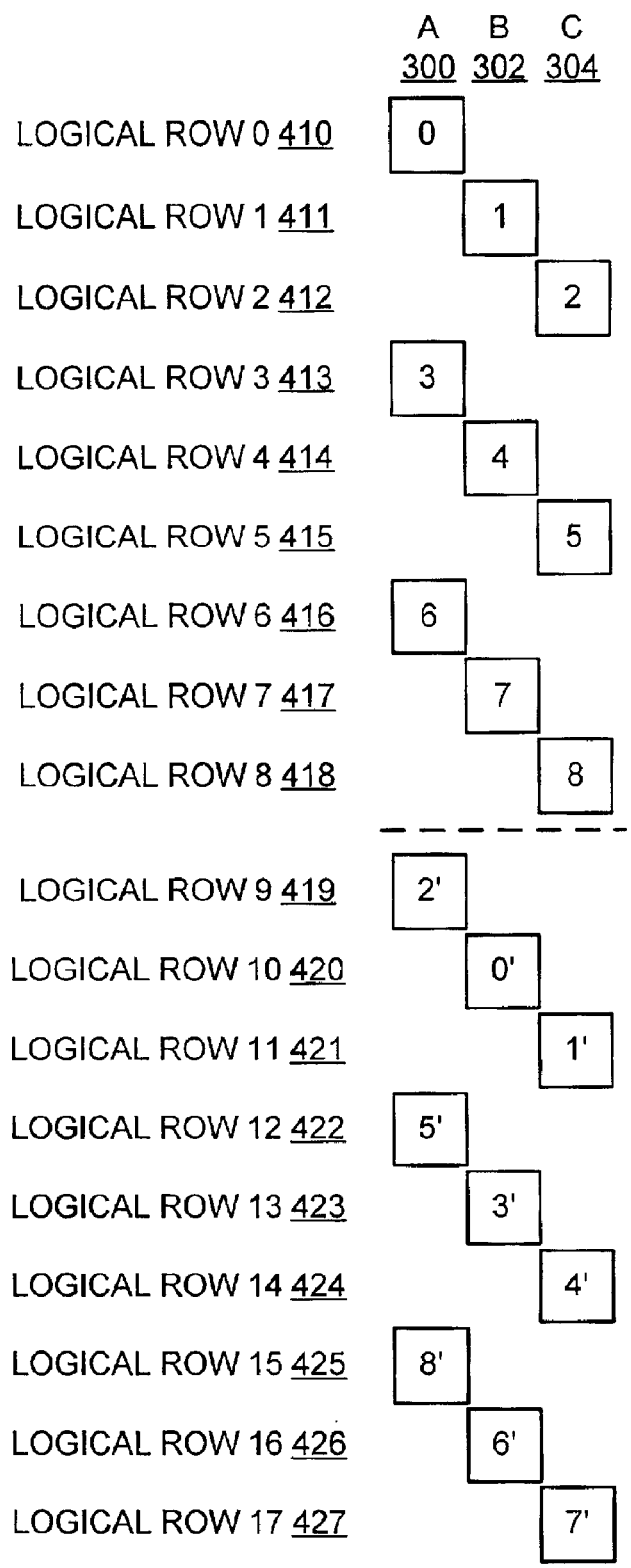
FIG. 4 is a logical mapping of stripes in a RAID level 1E array corresponding to FIG. 3 in accordance with the present invention.

FIG. 3 is a diagram depicting an exemplary preferred embodiment of the present invention wherein physical stripes on a RAID level 1E storage subsystem are mapped to permit contiguous reads of any number of sequential stripes of the RAID array. FIGS. 3 and 4 describe a simplified exemplary mapping structure in accordance with the present invention wherein nine stripes are mapped into physical stripes over three disk drives of the RAID level 1E array. Clearly those skilled in the art will recognize that any number of stripes and disks may be used in such an improved physical mapping. The simple example depicted in FIGS. 3 and 4 is therefore merely intended as representative of a wide range of disk array capacities and configurations.

In the simplified, exemplary embodiment of FIG. 3, nine stripes (identified as stripes 0 through 8) are distributed over the disk array as three physical stripes 310, 311 and 312. The exemplary physical mapping of FIG. 3 shows three disk drives in the array, drive A 300, drive B 302 and drive C 304. In like manner duplicate or mirrored stripes are physically distributed over the three disk drives of the array as physical stripes 313, 314 and 315. The mirrored individual stripes are indicated with the same stripe number has above (0 through 8) with a prime character "'" appended thereto.

Those skilled in the art will note that all original stripes are physically mapped to the RAID array such that any number of sequential stripes may be read from the array using a single I/O operation associated with each drive. Each single I/O operation reads (or writes) contiguous blocks stored on that drive. Further, in accordance with RAID level 1 mirroring, the same physical stripes may be accessed as the collection of mirrored stripes (313, 314 and 315) also using a single I/O operation associated with each drive to read or write contiguous physical stripes stored there on.

The dashed line between the original physical stripes (310, 311 and 312) and the duplicate or mirrored stripes (313, 314 and 315) emphasizes the contiguous nature of all original physical stripes and the contiguous relationship of all mirrored physical stripes. Such a physical mapping of stripes on a RAID level 1E array enables the use of a single I/O operation for each drive of the array and generation and management of a single, associated scatter/gather list. This physical mapping in accordance with the present invention therefore eliminates the need for additional I/O operations to be performed on any one of the disk drives of the array. Further, this physical mapping of the present invention obviates the need for wasted, duplicative reading of any particular physical stripe in the array. In this manner, the physical mapping of the present invention reduces resource utilization for RAID level 1E management in resource constrained RAID controllers. Elimination of multiple I/O operations on any one of the disk drives eliminates the need for generation and management of multiple scatter/gather lists for any one disk drive thereby reducing resource consumption. Elimination of duplicative, wasted access to physical stripes previously read or written by another I/O operation eliminates the need for allocation of additional buffer memory space within a resource constrained RAID controller.

FIG. 4 provides a logical presentation of the mapping of FIG. 3 to further emphasize the allocation of particular stripes on particular drives of the RAID disk array. As shown in the logical mapping of FIG. 4 and in accordance with the present invention, each stripe corresponds to a logical row in the array. In particular, drive A 300 has three contiguous stripes, namely, stripes 0, 3 and 6 in logical rows 410, 413 and 416, respectively. Disk drive B 302 has three physical stripes, namely, stripe 1, 4 and 7 mapped to logical rows 411, 414 and 417, respectively. Similarly, disk drive C 304 has three physical stripes, namely, stripe 2, 5 and 8 mapped to logical rows 412, 415 and 418, respectively.

Duplicate or mirrored stripes 0' through 8' are logically mapped to rows 419 through 427 in a similar manner. It will be noted however that a mirrored stripe is offset from its corresponding original stripe with respect to the three disk drives 300, 302 and 304 so that and original stripe and the corresponding duplicate or mirrored stripe are never on the same physical disk drive (this in accordance with standard RAID level 1E specifications).

Those of ordinary skill in the art will readily recognize that the physical and logical mappings of the present invention as depicted in FIGS. 3 and 4 are intended merely as simplified representations of an exemplary embodiment. Any number of physical stripes and corresponding duplicate or mirrored stripes may be mapped to such a system with any number of redundant disk drives for mirroring features of the RAID level 1E specifications. In general, each disk drive of the RAID level 1E array, in accordance with the present invention, provides a contiguous half of its total capacity for storage of original physical stripes in contiguous sequential locations and the second contiguous half of its total capacity for storage of duplicate, mirrored physical stripes in contiguous, sequential locations.

Further, those of ordinary skill in the art will readily recognize that the preferred location for any physical stripes may be readily determined from the physical capacity of each disk drive of the array and the preferred physical stripe size using simple modulo arithmetic.

Figure 2:
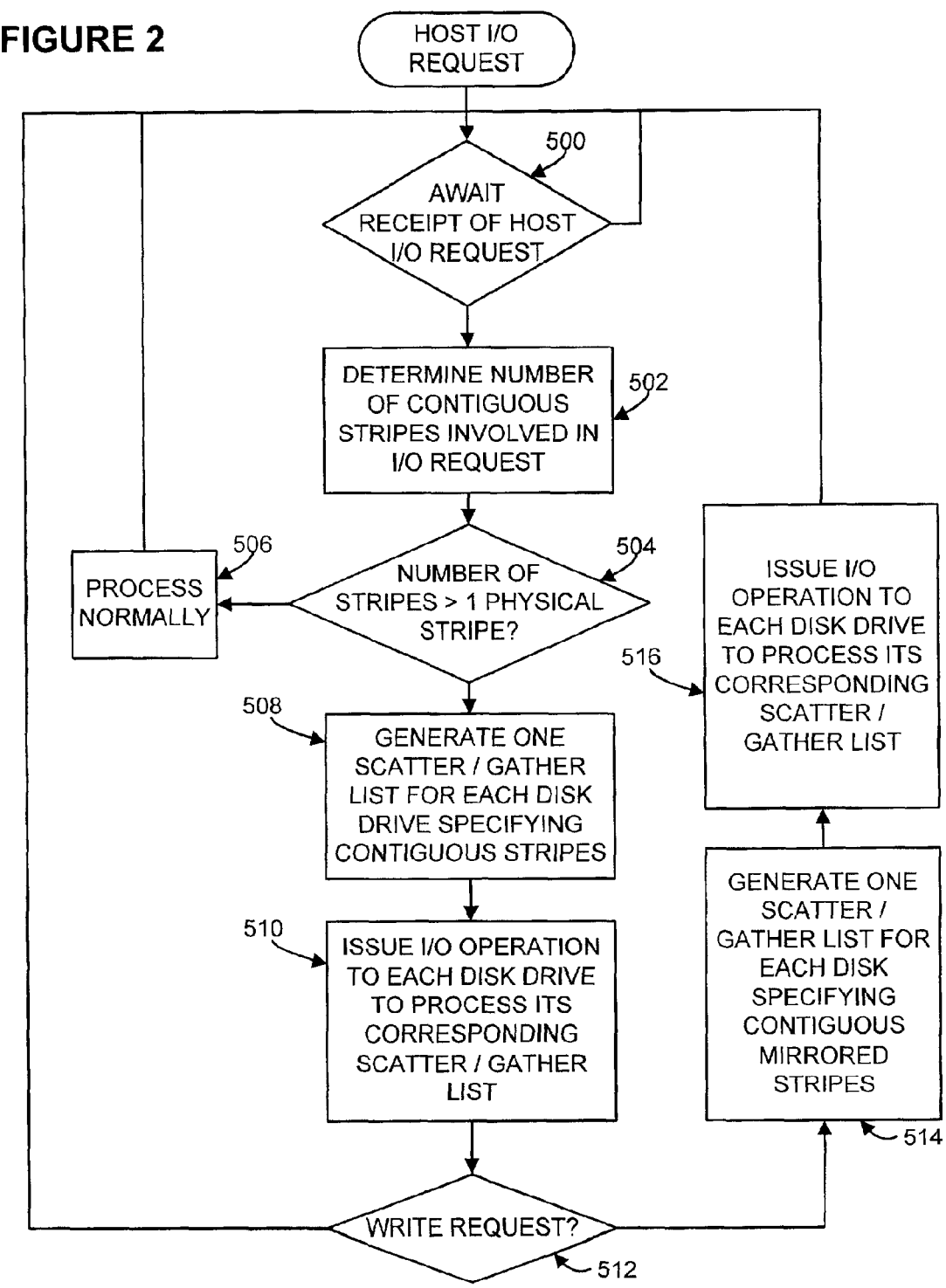
FIG. 2 is a flowchart describing operation of a method of the present invention to process I/O requests using the structures of FIGS. 3 and 4.

FIG. 2 is a flowchart describing a method of the present invention operable to process I/O request within a RAID level 1E storage subsystem enhanced according to the present invention. The method processes I/O requests received from host systems coupled to the storage subsystem in accordance with the improved RAID level 1E management and structures of the present invention. In particular, element 500 is operable to await receipt of an I/O request from a host system. Upon receipt of such a request, element 502 is operable to determine the number of sequential physical stripes involved in the I/O request. In accordance with the present invention, sequential physical stripes will be stored as contiguous stripes on the disks of the array.

Element 504 then determines whether the number of physical stripes involved in the I/O request is greater than one. If not, normal processing of the request may proceed at element 506 in accordance with standard RAID level 1E techniques. Processing then continues by looping back to element 500 to await receipt of a next I/O request from a host system.

If element 504 determines that more than one physical stripe is involved in the processing of the received I/O request, element 508 is next operable to generate a scatter/gather list for each disk drive of the array. Since all stripes to be accessed are contiguous on each disk drive of the array, a single scatter/gather list may be generated to read or write each stripe affected by the I/O request. As noted above, the contiguous nature of physical stripes in the mapping of the present invention obviates the need for multiple I/O requests and corresponding multiple scatter/gather lists to access non-contiguous stripes of the disk drives.

Those skilled in the art will readily recognize that a scatter/gather list construct is one possible structure useful to prepare a low-level I/O operation to access stripes on a disk drive. Numerous equivalent structures will be readily apparent to those of ordinary skill in the art to define a sequence of contiguous stripes on a disk drive to be accessed by a low-level I/O operation.

Element 510 is next operable to issue low-level I/O operations to each of the disk drives of the RAID level 1E array to commence processing within each disk drive to access the requested contiguous stripes stored thereon. The I/O operations are operable in accordance with the dictates of the scatter/gather list (or other similar construct) defining the list of sequential, contiguous stripes to be accessed on the corresponding disk drive.

Element 512 next determines if the received host I/O request was for a write operation. The processing of elements 508 and 510 performed the requested read or write access to the "original" stripes of the array affected by the I/O request. If the I/O request is a write request, the mirrored stripes corresponding to the affected original stripes are also written. If element 512 determines that the request is not a write request, processing continues by looping back to element 500 to await receipt of a next I/O request. Each of the I/O operations initiated proceeds, substantially in parallel, to completion as is known in the art.

If element 512 determines that the I/O request was a write request, elements 514 and 516 are operable in a manner similar to that of elements 508 and 510, respectively, to generate appropriate scatter/gather lists (or other similar structures) for writing the mirrored stripes to the disk drives and for initiating corresponding low-level I/O operations to process those scatter/gather lists. Each of the I/O operations initiated for writing the original stripes and the mirrored stripes then proceeds, substantially in parallel, to completion. Processing then continues by looping back to element 500 to await receipt of a next I/O request.

Those of ordinary skill in the art will recognize a variety of equivalent method steps to provide the features of the present invention. In particular, as noted, scatter/gather lists or other similar structures may be used to define the list of contiguous stripes to be accessed on each disk drive. Further, well-known caching and buffering techniques and structures may be used in conjunction with the invention to further enhance performance of the subsystem.

Still further, those of ordinary skill in the art will recognize that a RAID level 1E array may be an entire physical storage subsystem or may a portion of a larger subsystem wherein a portion of the total disk drives I the subsystem are managed in accordance with RAID level 1E techniques enhanced by the present invention. Such logical groupings of the total storage in a subsystem are often referred to as logical units or simply LUNs. Therefore, as used herein, a RAID level 1E array (or simply array) may refer to an entire storage subsystem or any logical division of the storage capacity of a subsystem such as a LUN.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A mapping structure for physically distributing original data stripes and mirrored data stripes onto a RAID level 1E disk array, said structure comprising:
   a first contiguous portion of each disk drive of said array containing multiple original data stripes; and
   a second contiguous portion of said each disk drive containing multiple mirrored data stripes corresponding to said multiple original data stripes.

2. The structure of claim 1 wherein said first contiguous portion is half the total capacity of said each disk drive and wherein said second contiguous portion is the other half of the total capacity of said each disk drive.

3. A method for processing requests involving multiple physical stripes in a RAID level 1E array comprising the steps of:
   receiving an I/O request to access said multiple physical stripes wherein each stripe of said multiple physical stripes comprises multiple data stripes;
   accessing, responsive to receipt of said I/O request, physically contiguous data stripes on a disk of said array wherein no stripe of said contiguous data stripes was previously accessed during processing of said I/O request; and
   repeating the step of accessing for another disk of said array such that all data stripes in said multiple physical stripes will be accessed only once.

4. The method of claim 3 wherein said I/O request is a read request and wherein the step of accessing comprises the step of:
   reading said physically contiguous data stripes on said disk wherein no stripe of said contiguous data stripes was previously read during processing of said I/O request.

5. The method of claim 3 wherein said I/O request is a write request and wherein the step of accessing comprises the step of:
   writing said physically contiguous data stripes on said disk wherein no stripe of said contiguous data stripes was previously written during processing of said I/O request.

6. The method of claim 5 further comprising the steps of:
   writing physically contiguous mirrored data stripes to a disk of said array wherein no stripe of said contiguous mirrored data stripes was previously written during processing of said I/O request; and
   repeating the step of writing mirrored data stripes for another disk of said array such that all mirrored data stripes corresponding to data stripes in said multiple physical stripes will be written only once.

7. A method for processing I/O requests operable in a RAID level 1E disk array having a plurality of disks storing stripes and corresponding mirrored stripes wherein each of said stripes and mirrored stripes comprises a plurality of stripes, said method comprising the steps of:
   receiving an I/O request to access multiple physical stripes on said disk array; and
   generating a plurality of low level I/O requests to access said multiple physical stripes on said disk array,
   wherein each generated low level I/O request accesses multiple contiguous data stripes on a disk drive of said disk array, and
   wherein no more than one low level I/O request is directed to any disk drive of said disk array.

* * * * *